April 12, 1932. L. J. WEBER 1,854,007

THERMAL RELAY

Filed March 18, 1930

Inventor:
Louis J. Weber,
by Charles E. Tullar
His Attorney.

Patented Apr. 12, 1932

1,854,007

UNITED STATES PATENT OFFICE

LOUIS J. WEBER, OF SCHENECTADY, NEW YORK, ASSIGNOR TO GENERAL ELECTRIC COMPANY, A CORPORATION OF NEW YORK

THERMAL RELAY

Application filed March 18, 1930. Serial No. 436,870.

The invention relates to thermal relays and more particularly to those of the bimetallic type having an electrical heater and adapted to provide time element overload protection for electric circuits.

The object of the present invention is to provide a thermal relay in which the electric heater substantially surrounds the bimetallic thermal element so as to give the maximum heating efficiency while at the same time the electric heater and also the bimetallic element are mounted to permit ready removal and replacement thereof.

A further object is to facilitate adjustment of the thermal element so that the time delay action thereof may be accurately regulated.

Figure 1:
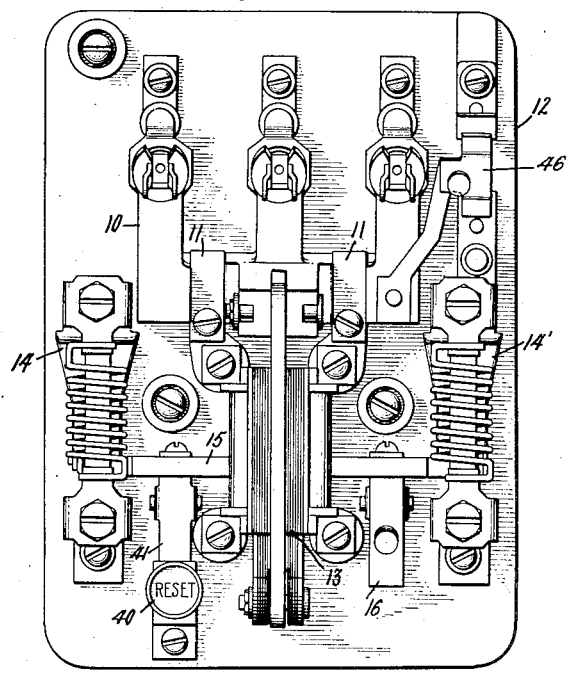
Figure 2:
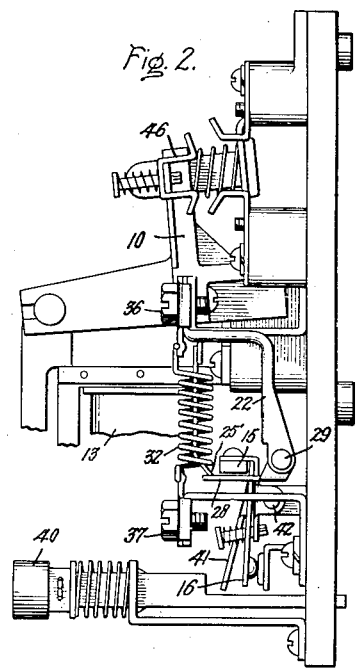
Figure 3:
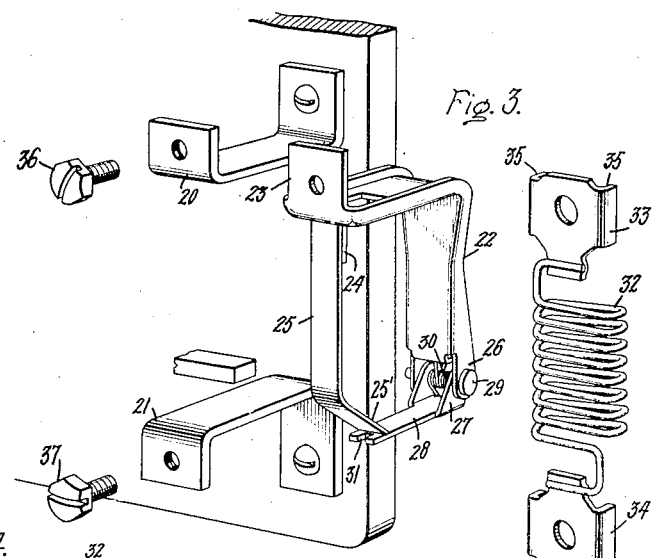
Figure 4:
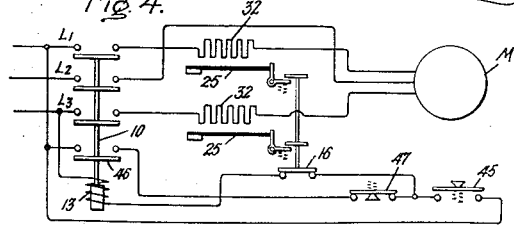

In the accompanying drawings, Fig. 1 is a front view of a three-phase motor starting switch provided with my improved form of overload protective relay; Fig. 2 is a side view of the switch; Fig. 3 is a slightly enlarged perspective view of the thermal relay with the parts thereof in disassembled relation and Fig. 4 is a circuit diagram showing the manner in which the thermal relays are connected in the circuit of the motor starting switch.

The motor starting switch in Fig. 1 is of the three-phase type and comprises essentially the three pole switch 10 rotatively mounted in the bearings 11 on the base 12 and mechanically connected to be operated by the electromagnet 13. Each of the two thermal relays 14 and 14' is connected in a corresponding one of the circuits controlled by the switch and arranged to operate the actuating member 15 for the control contact 16 which is connected in the energizing circuit of the operating electromagnet 13 as shown in Fig. 4.

As more clearly shown in Fig. 3, each of the thermal relays is mounted on the base 12 by means of the spaced apart supporting arms 20 and 21 which extend from the base. A channel frame member 22 of substantially L shape has the upturned lug 23 at one end thereof for mounting the frame on the support 20. The finger 24 is punched up from the frame 22 adjacent the lug 23 for supporting the bimetallic thermal element 25 of the relay. One end of the bimetallic element 25 preferably is welded to the finger 24 or firmly secured thereto in any other suitable manner. The other end of the L shaped frame member 22 is in the form of a yoke 26 within which the upturned bearing flanges 27 of the movable member 28 are pivotally mounted on the pin 29. A biasing spring 30 surrounds bearing pin 29 and engages with the frame 22 and movable member 28 so as normally to bias the member 28 into engagement with the free end 25' of the thermal element. The notch 31 is formed in the end of the movable member 28 to indicate the proper amount of overlapping of the free end 25' of the thermal element with the end of the movable member 28 controlled thereof to provide the desired time delay in the relays of the member 28 when the thermal element 25 is heated.

The thermal element 25 is heated in accordance with the current in one of the phases of switch 10 by means of the electrical heater 32. In order to obtain the maximum heating efficiency, the heater 32 is formed so as completely to encircle the thermal element 25 and in this way transmit heat to all sides of the thermal element. As shown the heater element 32 consists of a suitable resistance wire in the form of a flattened spiral adapted to closely surround the heater element 25 without actually touching the element at any point so as to limit the free movement thereof. Channel shaped terminals 33 and 34 are provided for the heating element so that the heater together with the channel frame 22 carrying the thermal element may be mounted in proper operating relation on the supports 20 and 21 with the heater electrically connected between the supports.

To assemble the parts of the thermal element shown in Fig. 3 in operating relation, the movable member 28 is tripped free from engagement with the end 25' of the thermal element and the heater element 32 is slipped over the end of the thermal element so as to bring the spiral turns of the heater into encircling relation with the thermal element. The member 28 then is reengaged with the end of the thermal strip. The upturned lug 23 of the frame 22 then is superimposed upon the supporting terminal 20 and the sides 35 of the channel shaped terminals 33 of the resistor are engaged with the sides of the lug 23 and the support 20 so as to hold the same in alignment and at the same time anchor the terminal 33 against rotation when the securing screw 36 is screwed into the support 20. The sides of the channel shaped frame 22 engage with the support 20 so as to firmly anchor the frame in operative position on the support 20. The channel shaped terminal 34 is anchored to the support 21 against rotation when the securing screw 37 is applied in the same manner.

With the relay parts mounted in operating relation as thus described and shown in Fig. 2, it will be observed that the electrical heater 32 encircles all except the extreme ends of the thermal element 25. As previously pointed out, this insures that the maximum amount of heat generated by the heater is transmitted to the thermal element. When the thermal element is heated the free end 25' thereof flexes to the left out of abutting engagement with the biased member 28. With the end of the thermal element 25 overlapping the end of the member 28 a definite distance, accurately determined by the notch 31, the time required for heating of the thermal element and the movement thereof out of engagement with the member 28 bears a definite relation to the heating current of the heater 32. Thus with the heater 32 designed to generate a predetermined amount of heat with a predetermined current therein, the time of operation of the thermal element 25 can be coordinated so as to provide proper time element overload protection of the circuit controlled by the switch 10.

When the free end 25' of the thermal element slides out of abutting engagement with the end of the biased member 28, the latter is no longer restrained and operates to engage the bar 15 and thereby tilt the control switch 16 to the circuit opening position.

To reset the switch 16 to the circuit closed position after the thermal element is cooled, the reset button 40 is operated to engage the arm 41 extending from the bar 15 and thereby operate the switch 16 in a counterclockwise direction about its pivot 42. Due to the yielding mounting of the contact 16, the bar 15 slides the end of the member 28 beyond the free end 25' of the thermal element into its initial position in alignment with the bottom of the notch 31. Thus upon release of the reset button 40, the member 28 is again held from movement in accordance with its bias under the control of the thermal element 25.

With the construction shown, the heater element is readily removable and thus may be replaced whenever desired with other heater elements having different characteristics so as to vary the time element action of the thermal element 25 as well as the current rating of the thermal relay. With the thermal element 25 constructed so as to move a definite distance to disengage the notched end of the member 28, it is only necessary to design the different heating elements so as to give the same heating effect with different values of current in order to maintain the time delay action of the thermal element constant over the longer range of current carrying capacities of the different heater elements. The accurate setting of the thermal element 25 obtained by means of the notch 31 insures that the same results may be obtained when the heaters of different current carrying capacity are used with the thermal relay.

With the circuit connections of the three-phase motor starting switch as shown in Fig. 4, the switch is closed by operation of the start button 45 to the closed position. This energizes the operating electromagnet 13 through a circuit extending from L—3 through the contact 16 of the thermal overload relay and the button 45 to L—1. Upon closure of switch 10 the auxiliary contact 46 establishes a holding circuit through the stop push button 47 and the contact 16 of the thermal relay. Thus with the characteristics of the heaters 32 properly co-ordinated with the current requirements of the motor M, the desired time element overload protection of the motor is provided by the thermal relays opening the contact 16.

In case the motor starting switch is used with a motor of different rating, it is only necessary to remove the heater 32 of the thermal relay and substitute a different heater having characteristics corresponding to those of the motor to be protected thereby. With the construction shown, the removal of the heater 32 and substitution of another heater in encircling relation with the thermal element 35 may be readily and quickly accomplished simply by removal of terminal screws 36 and 37 and tripping the member 28 free from engagement with the end of the thermal element in the manner previously described. Moreover, in case of damage to the thermal element 25 itself due to heavy short circuit currents fusing the heater and thereby burning the thermal element, a new frame 22 with the thermal element 25 secured in operating relation therein readily may be substituted.

What I claim as new and desire to secure by Letters Patent of the United States, is:

1. A thermal relay comprising a frame having a bimetallic element supported at one end, a removably mounted electrical heater encircling an intermediate portion of the element, and a movable member cooperating with the free end of the element and operable away therefrom to permit removal of the encircling heater.

2. A thermal relay comprising a base, a frame removably mounted on the base and having a bimetallic thermal element and a movable member controlled thereby mounted in a definite cooperating relation on the frame, and a separately removable electric heater encircling the thermal element mounted on the base.

3. A thermal relay comprising a frame, a bimetallic element fixedly mounted at one end on the frame, and a movable member mounted on the frame in cooperating relation with the free end of the thermal element and an electric heater encircling an intermediate portion of the thermal element and removable over the free end of the thermal element.

4. A thermal relay having a pair of spaced apart supports, a frame removably mounted on one of the supports and having a bimetallic element and a movable member controlled thereby mounted in cooperating relation on the frame, and an electrical heater mounted on said spaced apart supports and encircling an intermediate portion of the thermal element, and removable over the free end of the thermal element.

5. A thermal relay comprising a pair of spaced apart supports, a substantially L shaped frame removably mounted on one of said supports, a bimetallic element fixedly mounted at one end on said frame, a member movably mounted on said frame and biased into engagement with the free end of the thermal element, and an electrical heater removably mounted on said supports and encircling an intermediate portion of said thermal element and removable over the free end thereof.

In witness whereof, I have hereunto set my hand this 17th day of March, 1930.

LOUIS J. WEBER.